United States Patent [19]

Geissler et al.

[11] 4,327,938
[45] May 4, 1982

[54] VEHICLE FRAME WITH AN ENERGY-DISSIPATING FRAME PART

[75] Inventors: Heinrich Geissler, Stuttgart; Josef Gratz, Fellbach, both of Fed. Rep. of Germany

[73] Assignee: Daimler-Benz Aktiengesellschaft, Stuttgart, Fed. Rep. of Germany

[21] Appl. No.: 79,205

[22] Filed: Sep. 26, 1979

[30] Foreign Application Priority Data

Sep. 26, 1978 [DE] Fed. Rep. of Germany ....... 2841796

[51] Int. Cl.³ .............................................. B62D 21/00
[52] U.S. Cl. .................................... 280/784; 280/794
[58] Field of Search ..................... 280/784, 793, 794; 293/132, 133, 134

[56] References Cited

U.S. PATENT DOCUMENTS

| 2,113,540 | 4/1938 | Maddock | 280/794 |
| 3,138,118 | 6/1964 | Dean | 293/132 |
| 3,718,364 | 2/1973 | Fischer et al. | 280/784 |
| 3,831,997 | 8/1974 | Myers | 280/784 |
| 3,840,260 | 10/1974 | Wacker et al. | 293/132 |
| 4,200,310 | 4/1980 | Carney | 280/784 |

FOREIGN PATENT DOCUMENTS

| 499020 | 5/1930 | Fed. Rep. of Germany | 293/134 |
| 1192983 | 10/1959 | France | 293/134 |

Primary Examiner—Joseph F. Peters, Jr.
Assistant Examiner—Ross Weaver
Attorney, Agent, or Firm—Craig and Antonelli

[57] ABSTRACT

A vehicle frame with an energy-dissipating frame section, which includes at least two longitudinal bearers to be primarily deformed that extend at a distance from one another in the vehicle longitudinal direction, and a cross-bearer connecting the two longitudinal bearers. A stablizing element, disposed between the cross bearer and the longitudinal bearers, is suppported at the cross bearer and at least at frame longitudinal bearers adjoining the longitudinal bearers to be primarily deformed.

21 Claims, 4 Drawing Figures

U.S. Patent     May 4, 1982     4,327,938
FIG. 1
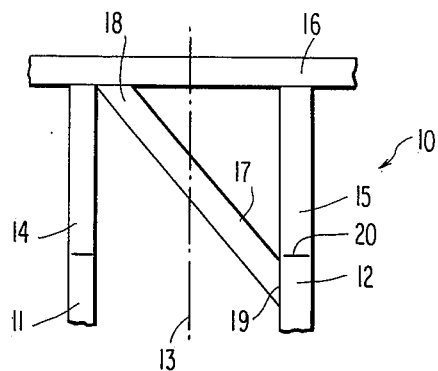
FIG. 2
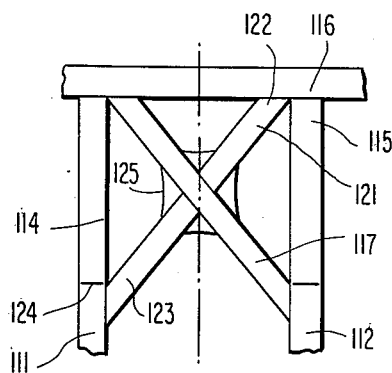
FIG. 3a 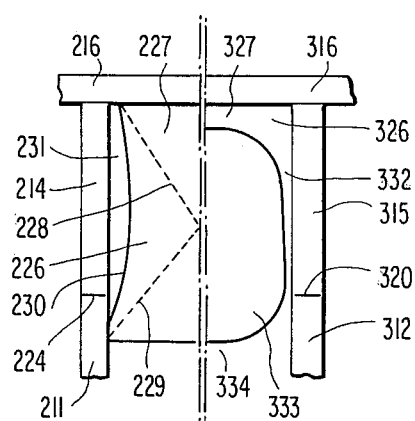 FIG. 3b

VEHICLE FRAME WITH AN ENERGY-DISSIPATING FRAME PART

The present invention relates to a vehicle frame with an energy-dissipating frame part which includes at least two primarily deformable longitudinal bearers extending in the vehicle longitudinal direction at a distance from one another and a cross bearer connecting the two longitudinal bearers and extending transversely thereto.

One utilizes intentionally the deformability of the longitudinal bearers to be deformed primarily in the forward or also rearward area depending on the arrangement in the vehicle, for the controlled energy-absorption as safety against a central vehicle collision with an obstacle acting in the vehicle longitudinal direction and thereby axially parallel. The longitudinal bearers to be deformed primarily, at the free ends of which is seated the cross bearer, dissipate the impact energy in that they can be crushed or compressed essentially in the longitudinal direction and fold. Folding bulges result therefrom. If, in contrast thereto, offset or inclined collisions occur, then the danger exists as a result of the introduction of bending moments from the cross bearer into the longitudinal bearers that it will lead to an uncontrolled buckling of the longitudinal bearers in lieu of the aimed-at crushing or collapsing operation.

It is the aim of the present invention to provide a vehicle frame with an energy-dissipating frame portion of the type described above, in which the cross bearer is laterally stabilized and bending moments and cross forces which become effective with an offset or inclined collision impact, are reduced also by a deformation acting essentially in the longitudinal direction of the longitudinal bearers without danger of an uncontrolled buckling of the longitudinal bearers.

The underlying problems are solved with a vehicle frame having an energy-dissipating frame section of the type described above by at least one stabilizing element between the cross bearer and the longitudinal bearers which is supported, on the one hand, at the cross bearer and, on the other, at least at the frame longitudinal bearers adjoining the longitudinal bearers to be primarily deformed.

A lateral stabilization of the cross bearer relative to the frame longitudinal bearers not to be primarily deformed is achieved by the construction according to the present invention. The stabilizing element prevents, by reason of a defined rigidity and predetermined deformation behavior, an uncontrolled buckling of the longitudinal bearers in case of offset or inclined collisions producing bending moments and effective cross forces introduced into the longitudinal bearers from the cross bearer. The bending moments and cross forces are reduced in the deformation elements acting primarily in the vehicle longitudinal direction, i.e., in the longitudinal bearers to be primarily deformed and in the stabilizing element or stabilizing elements.

An advantageous construction results from a stabilizing element which includes at least one diagonal bearer. It thereby depends from the individual constructive requirements whether a single diagonal bearer is sufficient as stabilizing element. A construction is thereby additionally advantageous in which the diagonal bearer is supported with one end at a frame longitudinal bearer which adjoins the longitudinal bearer to be primarily deformed in the extension of the latter, and with its other end at the cross bearer, preferably directly adjacent the connecting place of the other longitudinal bearer to be primarily deformed at the cross bearer. A lateral stabilization of the cross bearer relative to the frame longitudinal bearers not to be primarily deformed is achieved thereby. The diagonal bearer reduces, by way of the cross bearer bending moments effective cross forces which are introduced with an offset or inclined impact, essentially also by deformation in the vehicle longitudinal direction, whereby the longitudinal bearers to be primarily deformed also deform in the aimed-at manner in their longitudinal direction by folding and compression or crushing without danger of an uncontrolled buckling.

A further advantageous construction results from a second diagonal bearer which extends diagonally to the first diagonal bearer and forms together with the latter a cross connection or cross bracing. The arrangement of two diagonal bearers offers the advantage of the symmetrical construction and of a still better lateral stabilization of the cross bearer.

Accordingly, it is an object of the present invention to provide a vehicle frame with an energy-dissipating frame part which avoids by simple means the aforementioned shortcomings and drawbacks encountered in the prior art.

Another object of the present invention resides in a vehicle frame with an energy-dissipating frame section which prevents an uncontrolled buckling of the longitudinal bearers even if the impact arrives offset or obliquely to the longitudinal direction.

A further object of the present invention resides in a vehicle frame with longitudinal bearers to be primarily deformed which are interconnected by at least one cross bearer, in which the cross bearer is laterally stabilized and bending moments as well as cross forces are reduced by deformation essentially in the longitudinal direction of the longitudinal bearers without danger of uncontrolled buckling.

Still a further object of the present invention resides in a vehicle frame which can be used for passenger motor vehicles as well as trucks.

These and other objects, features and advantages of the present invention will become more apparent from the following description when taken in connection with the accompanying drawing which shows, for purposes of illustration only, several embodiments in accordance with the present invention, and wherein:

FIG. 1 is a schematic plan view on a part of a vehicle frame according to the present invention;

FIG. 2 is a schematic plan view on a part of a modified embodiment of a vehicle frame according to the present invention;

FIG. 3a is a schematic plan view on a part of a still further modified embodiment of a vehicle frame in accordance with the present invention; and FIG. 3b is a schematic plan view on a part of a still further modified embodiment of a vehicle frame according to the present invention.

Referring now to the drawing wherein like reference numerals are used throughout the various views to designate like parts, the frame part generally designated by reference numeral 10 which is illustrated in FIG. 1, includes two schematically shown frame longitudinal bearers 11 and 12 which extend in the vehicle longitudinal direction 13 and proceed essentially parallel to one another and at a distance from one another. The frame longitudinal bearers 11 and 12 continue in FIG. 1 in the upward direction in longitudinal bearers 14 and 15 to be primarily deformed which are connected with each other at the upper end in FIG. 1 by way of a cross bearer 16. The cross bearer 16 is disposed essentially at right angle to the vehicle longitudinal direction 13.

A stabilizing element in the shape of a diagonal bearer 17 is disposed within the area between the cross bearer 16 and the longitudinal bearers 14 and 15 to be primarily deformed. The diagonal bearer 17 is supported with its upper end 18 in FIG. 1 at the cross bearer 16, and more particularly adjacent the connecting place, at which the left longitudinal bearer 14 of FIG. 1 is supported at the cross bearer 16. With its lower end 19 as shown in FIG. 1, the diagonal bearer 17 is supported at the right frame longitudinal bearer 12 and more particularly at a distance of that end 20 which separates the length of the longitudinal bearer 15 to be primarily deformed from the remaining frame bearer 12 not to be primarily deformed. This end 20 is naturally only an imaginary location which delimits the length of the longitudinal bearer 15 to be primarily deformed.

The diagonal bearer 17 stabilizes the cross bearer 16 in the lateral direction, and more particularly relative to the frame longitudinal bearer 12 not to be primarily deformed. The diagonal bearer 17 imparts to the frame part 10 a defined rigidity and a predetermined deformation behavior. With an offset or inclined impact, bending moments which are introduced from the cross bearer 16 into the longitudinal bearers 14, 11, respectively, 15, 12 and additionally effective cross forces are reduced by way of the diagonal bearer 17. As a result thereof, with an inclined or offset impact, an uncontrolled buckling of the longitudinal bearers 14 and 15 which might continue up to the frame longitudinal bearers 11 and 12, is prevented.

In the second embodiment according to FIG. 2 corresponding reference numerals of the 100 series are used for corresponding parts of FIG. 1 so that reference may be had to the descriptive text of the first embodiment of FIG. 1 in order to avoid repetition. In the second embodiment, a second diagaonal bearer 121 is provided in addition to the first diagonal bearer 117 which extends diagonally to the first diagonal bearer 117 and forms together with the latter a cross connection. The second diagonal bearer 121 is supported with its upper end 122 in FIG. 2 at the cross bearer 116, and more particularly directly adjacent the connecting place, at which the right longitudinal bearer 115 in FIG. 2 which is to be primarily deformed adjoins the cross bearer 116. The second diagonal bearer 121 is supported by means of its lower end 123 in FIG. 2 at the left frame longitudinal bearer 111 which is not to be primarily deformed, and more particularly below the end 124 which delimits the length of the longitudinal bearer 114 to be primarily deformed. Within the area of their intersection, the two diagonal bearers 117 and 121 are additionally connected with each other by indicated intersection sheet metal plates 125. The cross-wise arrangement of two diagonal bearers 117 and 121 leads to a still better lateral stabilization of the cross bearer 116.

In the third embodiment, illustrated in part in FIG. 3a to the left of the separating line which represents the vehicle longitudinal direction and in the fourth embodiment of FIG. 3b illustrated to the right of the separating line, a sheet metal panel 226, respectively, 326 each is provided as stabilizing element. The sheet metal panel 226 in the third embodiment is supported at the cross bearer 216, and more particularly the sheet metal panel 226 engages thereat with an edge 227 essentially over the entire length of the cross bearer 216, which extends between the left longitudinal bearer 214 and the corresponding right longitudinal bearer, not shown in the third embodiment of FIG. 3a, which is of symmetrical construction; the left and right longitudinal bearers engage both at the cross bearer 216. As shown, the sheet metal panel 226 formed, for example, by a suitable sheet-metal member or plate-like element, is not supported at the longitudinal bearer 214 to be primarily deformed but instead is supported below the symbolically indicated end 224 at the left frame longitudinal bearer 211 not to be primarily deformed. The support of the sheet-metal panel 226 at the right frame longitudinal bearer (not shown) takes place in a similar manner. The arrangement is therefore essentially symmetrical with respect to the separating line indicated in the vehicle longitudinal direction as symmetry axis.

The sheet-metal panel 226 may be reinforced and/or apertured corresponding to the respective constructive requirements. Reinforcing grooves 228 and 229 of the sheet-metal panel 226 are indicated by the dash lines which extend diagonally over the sheet-metal panel 226. In addition thereto or in lieu thereof, reinforcing grooves disposed approximately at right angle to the cross bearer 216 and/or parallel thereto or also other embossments or indentations which determine a definite rigidity and predetermined deformation behavior, may be provided. As can be seen in the third embodiment of FIG. 3a, an aperture 231 is provided between the left edge 230 of the sheet-metal panel 226 and the side of the longitudinal bearer 214 facing the same. In another embodiment, not shown in detail, this aperture 231 may also be dispensed with so that the sheet-metal panel 226 engages with its left edge 230, starting from the cross bearer 216, both at the longitudinal bearer 214 as also at the frame longitudinal bearer 211.

The fourth embodiment illustrated in FIG. 3b illustrates a construction in which the sheet-metal panel 326 is supported along its side edge at the cross bearer 316, exactly as in the third embodiment of FIG. 3a, and additionally also at the frame longitudinal bearer 312. In addition thereto, the sheet-metal panel 326 is, however, also supported at the longitudinal bearer 315 to be primarily deformed, and more particularly over the entire length thereof up to the symbolic end 320. The right edge 332 of the sheet metal panel 326 which is shown in FIG. 3b, extends therefore continuously from the cross bearer 316 along the longitudinal bearer 315 and the frame longitudinal bearer 312. The sheet-metal panel 326 engage with its edge 327 at the cross bearer 316, which edge 327 extends over the entire length of the cross bearer 316 between the two longitudinal bearers. In the center region 333, the sheet-metal panel 326 is apertured over a large area. The central apertured area 333 is delimited by the edges 327 and 332 as well as by a lower edge 334 which extends at the height of the frame longitudinal bearer 312.

In a further embodiment according to the present invention, not shown in detail herein, a construction of the embodiments of the stabilizing element described in connection with FIGS. 1 to 3 is arranged inside of an energy-absorbing underrunning protection of a truck of which may be of any conventional construction and normally involves a bumper-like device arranged at the rear section of a truck which prevents that lower vehicles might reach underneath the body of a truck in case of an accident. It may thereby be of advantage if the stabilizing element is additionally arranged between two energy-absorbing elements, for example, shock absorbers in order to increase the protective action with an inclined impact.

It is additionally understood that the stabilizing element described hereinabove is suitable in a similar manner for an energy-absorbing crash zone in passenger motor vehicles as also in trucks.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A vehicle with an energy-dissipating frame part which includes at least two spaced longitudinal bearer means to be primarily deformed extending in a vehicle longitudinal direction, and a cross bearer means for connecting the two longitudinal bearer means, characterized in that a stabilizing means is disposed between the cross bearer means and the primarily deformable longitudinal bearer means, the stabilizing means is supported at the cross bearer means adjoining the longitudinal bearer means to be primarily deformed and includes a sheet-panel means supported at the cross bearer means and at least at the further frame longitudinal bearer means adjoining the longitudinal bearer means to be primarily deformed, and in that the sheet metal panel means is provided with aperture means.

2. A vehicle frame according to claim 1, characterized in that the further frame longitudinal bearer means is arranged as an extension of the associated adjoining primarily deformable longitudinal bearer means.

3. A vehicle frame according to claim 2, characterized in that the further frame longitudinal bearer means and associated adjoining primarily deformable longitudinal bearer means extend as a continuous structure in the longitudinal direction of the vehicle.

4. A vehicle frame according to claim 3, characterized in that the further frame longitudinal bearer means and associated adjoining primarily deformable longitudinal bearer means form a continuous unitary longitudinal bearer structure.

5. A vehicle frame according to claim 4, characterized in that the cross bearer means extends essentially at right angle to the longitudinal frame bearer means.

6. A vehicle frame according to one of claims 2, 3, 4, 5 or 1, characterized in that the stabilizing means includes a sheet-metal panel means supported at the cross bearer means and at least at the further frame longitudinal bearer means adjoining the primarily deformable longitudinal bearer means.

7. A vehicle frame according to claim 6, characterized in that the sheet-metal panel means includes reinforcing groove means.

8. A vehicle frame according to claim 7, characterized in that the reinforcing groove means extend substantially diagonally over the sheet-metal panel means.

9. A vehicle frame according to claim 6, characterized in that the sheet-metal panel means is provided with openings.

10. A vehicle frame according to claim 6, characterized in that the sheet-metal panel means engages along an edge of the primarily deformable longitudinal bearer means.

11. A vehicle frame with an energy-dissipating frame part which includes at least two spaced longitudinal bearer means to be primarily deformed extending in a vehicle longitudinal direction, and a cross bearer means for connecting the two longitudinal bearer means, characterized in that a stabilizing means is disposed between the cross bearer means and the primarily deformable longitudinal bearer means, the stabilizing means is supported at the cross bearer means adjoining the longitudinal bearer means to be primarily deformed and includes a sheet-metal panel means supported at the cross bearer means and at least at the further frame longitudinal bearer means adjoining the longitudinal bearer means to be primarily deformed, the sheet-panel means engaging along an edge of the longitudinal bearer means to be primarily deformed and in that the sheet metal means includes an aperture in a center area thereof, the aperture is delimited by an edge engaging a length of the cross bearer means between the two longitudinal bearer means to be primarily deformed and by edges respectively engaging the longitudinal bearer means to be primarily deformed.

12. A vehicle frame according to claim 11, characterized in that the sheet-metal panel means includes reinforcing groove means.

13. A vehicle frame according to claim 12, characterized in that the reinforcing groove means extend substantially diagonally over the sheet-metal panel means.

14. A vehicle frame according to claim 2, 3, 4, 5 or 1, characterized in that the stabilizing means is arranged inside of an energy-absorbing underrunning protection means of a truck.

15. A vehicle frame according to claim 14, characterized in that the stabilizing means is arranged between two energy-dissipating elements.

16. A vehicle frame according to claim 15, characterized in that said energy-dissipating elements are shock absorbers.

17. A vehicle frame according to claim 15, characterized in that a sheet-metal panel means is supported at the cross bearer means and at least at the further frame primarily deformable longitudinal bearer means adjoining the primarily deformable longitudinal bearer means.

18. A vehicle frame according to one of claims 1 or 11, characterized in that the further frame longitudinal bearer means is arranged as an extension of the associated adjoining longitudinal bearer means to be primarily deformed.

19. A vehicle frame according to claim 18, characterized in that the further frame longitudinal bearer means and associated adjoining longitudinal bearer means to be primarily deformed extend as a continuous structure in a longitudinal direction of the vehicle.

20. A vehicle frame according to claim 19, characterized in that the further frame longitudinal bearer means and associated adjoining longitudinal bearer means to be primarily deformed form a continuous unitary longitudinal bearer structure.

21. A vehicle frame according to claim 20, characterized in that the cross bearer means extends essentially at right angle to the longitudinal frame bearer means.

* * * * *